United States Patent [19]

King et al.

[11] Patent Number: 5,688,051

[45] Date of Patent: Nov. 18, 1997

[54] RADIATION PYROMETER ASSEMBLY FOR SENSING THE TEMPERATURE OF AN ELONGATE BODY MOVING LONGITUDINALLY

[75] Inventors: Roger Ernest King, Wimbourne; Graham Peter Spurge, Poole, both of England

[73] Assignee: Davy McKee (Poole) Limited, Poole, United Kingdom

[21] Appl. No.: 416,890

[22] PCT Filed: Oct. 20, 1993

[86] PCT No.: PCT/GB93/02162

§ 371 Date: Apr. 12, 1995

§ 102(e) Date: Apr. 12, 1995

[87] PCT Pub. No.: WO94/09348

PCT Pub. Date: Apr. 28, 1994

[30] Foreign Application Priority Data

Oct. 21, 1992 [GB] United Kingdom .................. 9222082

[51] Int. Cl.⁶ ....................................................... G01J 5/00
[52] U.S. Cl. ............................................ 374/129; 374/126
[58] Field of Search ......................... 73/159, 160; 374/2, 374/4, 120, 121, 123, 126, 129

[56] References Cited

U.S. PATENT DOCUMENTS

| 3,065,324 | 11/1962 | McNair | 219/10.69 |
|---|---|---|---|
| 3,245,261 | 4/1966 | Buteux et al. | 374/123 |
| 3,451,254 | 6/1969 | Maley | 374/126 |
| 4,435,092 | 3/1984 | Iuchi | 374/129 |
| 4,831,258 | 5/1989 | Paulk | 250/349 |
| 5,294,200 | 3/1994 | Rall | 73/160 |
| 5,364,187 | 11/1994 | Thakur et al. | 374/121 |
| 5,464,284 | 11/1995 | Rall | 73/160 |

FOREIGN PATENT DOCUMENTS

| 2 554 587 | 5/1985 | France . |
|---|---|---|
| 59-111024 | 6/1984 | Japan . |
| 60-205225 | 10/1985 | Japan . |
| 60-205226 | 10/1985 | Japan . |
| 705327 | 3/1954 | United Kingdom . |
| WO 90/12295 | 10/1990 | WIPO . |

Primary Examiner—G. Bradley Bennett
Attorney, Agent, or Firm—Lee, Mann, Smith, McWilliams, Sweeney & Ohlson

[57] ABSTRACT

A radiation pyrometer assembly and method for sensing the temperature of an elongate body, such as metal strip, moving longitudinally in the direction of its length includes a spray gun which deposits a narrow stripe of black paint of a uniform emissivity, upon one surface of the strip as it moves towards a temperature sensing station. The sensing station includes a calibration radiation pyrometer arranged to view the black stripe once the temperature of the stripe has reached the temperature of the strip. The accuracy of the apparatus may be improved by the provision of a process control radiation pyrometer directed to the opposite, unpainted surface of the strip the combined readings from the two pyrometers allow the correction of otherwise unpredictable errors in the temperature of the strip.

9 Claims, 2 Drawing Sheets

RADIATION PYROMETER ASSEMBLY FOR SENSING THE TEMPERATURE OF AN ELONGATE BODY MOVING LONGITUDINALLY

The present invention is concerned with the provision of a radiation pyrometer assembly capable of accurately and quickly sensing the temperature of an elongate body moving longitudinally through a process line. Such apparatus is valuable for controlling process stages such as annealing aluminium strip prior to rolling without having any direct contact between a temperature sensor and the strip.

A problem experienced with conventional use of a radiation pyrometer for sensing the temperature of objects such as metal strip is that the radiation emitted from the surface of the strip is dependent on the emissivity of the surface. So long as the emissivity is constant accurate temperature sensing is possible, however, with materials such as aluminium strip the surface emissivity can vary unpredictably sometimes exacerbated by low radiated energy levels.

Accordingly the present invention aims to provide a radiation pyrometer assembly for sensing the temperature of an elongate body moving longitudinally comprising, means to coat longitudinally distributed parts of the body with a coating having a substantially uniform emissivity and radiation pyrometer means disposed to view coated parts of the body as the body passes a temperature measurement station.

By coating parts of the body with a coating of uniform emissivity the problem of errors in radiation pyrometry temperature measurement is largely eliminated because the coating is at practically the same temperature as the body and because the emissivity of the coating is known the temperature can be accurately calculated. Preferably the coating will be black in order to provide a large radiation signal. The assembly will be used over a wide range of temperatures so that the coating must be selected to remain in intimate contact with the surface of the object even during and after passage through a furnace such as an annealing furnace.

In a preferred form of the assembly a process-control radiation pyrometer is arranged in the usual manner to view one uncoated face of the body as it passes the temperature measurement station, whilst simultaneously a second calibration radiation pyrometer views a coated face on the reverse side of the body. The reading of the second pyrometer is used to correct the reading of the first pyrometer. In the case where the elongate body is a strip of metal it is convenient to apply the coating as a stripe on the reverse side of the body.

The coating may be applied by brush painting or preferably by a spraying apparatus. The coating can be selected to be easily removed downstream of the radiation pyrometer(s) by brushing or washing.

It will be understood that in practice it is not possible to apply the paint to an extensive portion of the body since the presence of the paint, or the means used to remove it subsequently, will be detrimental to the product. Therefore the paint stripe is applied only from time to time to portions of the body which are not intended as finished product and it is assumed that between these portions the emissivity of the body, and the performance of the process control pyrometer, will not vary significantly.

BRIEF DESCRIPTION OF THE DRAWINGS

Radiation pyrometer assemblies embodying the present invention will now be described, by way of example only, with reference to the accompanying drawings, wherein.

Figure 1:
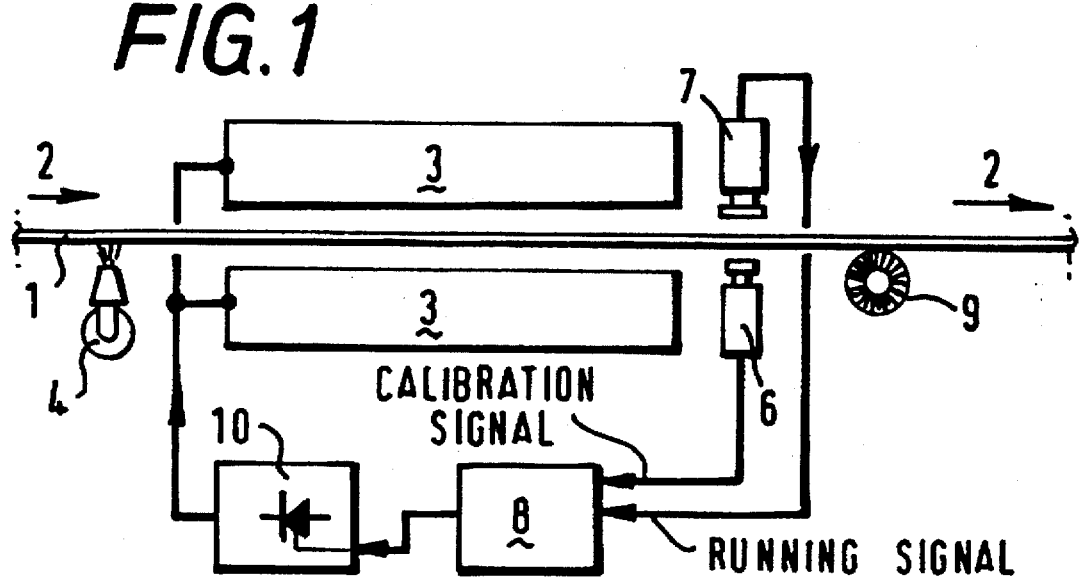
FIG. 1 is a diagrammatic view of the apparatus from one side.
Figure 2:
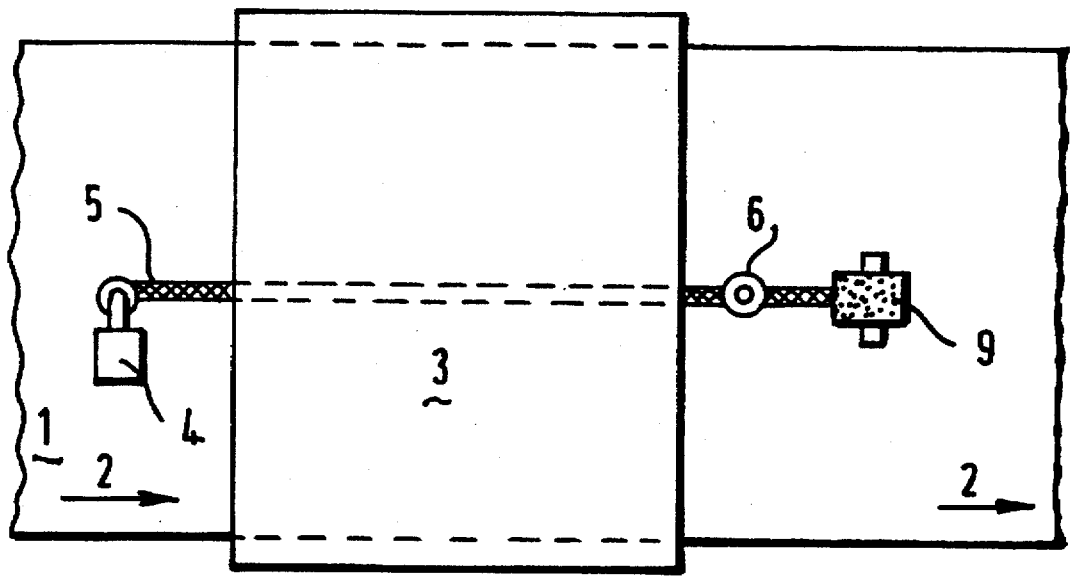
FIG. 2 is a diagrammatic view of the apparatus from below.
Figure 3:
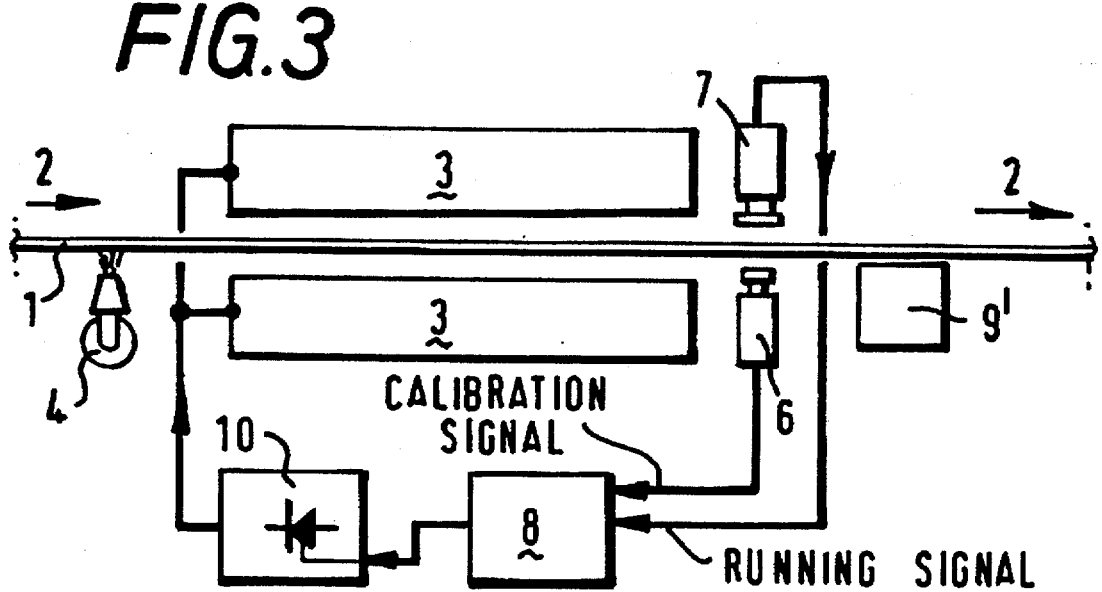
FIG. 3 is a diagrammatic view of a second radiation pyrometer assembly from one side embodying the invention.
Figure 4:
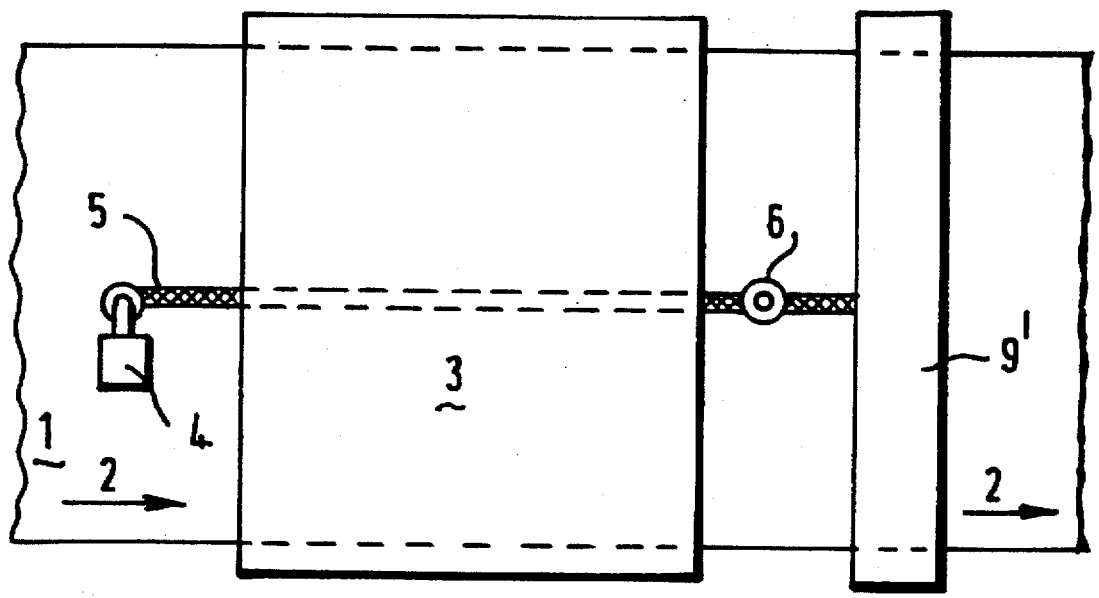
FIG. 4 is a view of the embodiment of FIG. 3 from below.

The apparatus shown in FIGS. 1 and 2 is part of an aluminium strip thermal treatment line in which the aluminium strip 1 is heated during its passage in the direction of arrow 2 by induction heating elements 3 to a temperature sufficient to anneal the strip 1 to prepare it for rolling or other processes. As the strip 1 approaches the induction heaters 3, which are disposed one each to either side of the strip 1, the strip 1 passes through a painting means at which a spray gun 4 deposits a continuous narrow stripe 5 of black paint on to one surface of the strip 1 for such a length along the strip as is necessary to obtain a stable pyrometer reading. Preferably the stripe is applied centrally of the strip surface as shown in FIG. 2. It will be appreciated that the paint used must be of a material which provides a smooth, dense, thin black coating, is thermally conductive, is heat resistant and easily removed by brushing or washing or other means, after exposure to heat.

Downstream of the spray means the strip 1 passes between the induction heaters 3. The strip then passes between two oppositely disposed radiation pyrometers, one, known as the calibration pyrometer 6, being directed to view the black stripe 5 and the other, known as the process control pyrometer 7, being directed at the opposite, unpainted side of the strip 1. Pyrometer 6 can be of a comparatively simple type which reads satisfactorily at a single infra-red wavelength at constant high emissivity, whereas pyrometer 7 must be of a more elaborate type, typically operating at two or more wavelengths in the infra-red spectrum, capable of reading surfaces of low and varying emissivity. Because the black stripe 5 is at practically the same temperature as the strip 1 and forms a radiating surface of practically constant emissivity, the errors normally caused by unpredictable changes in the emissivity of the surface of the strip are avoided. The signal from pyrometer 6 is therefore regarded as truly representative of the temperature and can be used to correct the reading of pyrometer 7 from time to time, both in terms of its response to emissivity change and its internal drift. The alternative method of re-calibration by temporary attachment of thermocouples is found to be impracticable in production circumstances.

The signals generated by each pyrometer 6, 7 are fed to a control station computer 8 where the correction is made for the temperature of the strip 1 as it emerges from the heaters 3.

The temperature once determined, is used by the control station 8 as a parameter for regulating the heaters 3 to control the strip temperature, by way of a power unit 10.

Since further processing of the strip with the stripe 5 in place may contaminate components in the process line a brush 9 is placed downstream of the pyrometer 6, to remove the stripe.

In the second embodiment, the brush 9 is replaced by a washing means 9' to remove the stripe.

It will be appreciated that the assembly and method of the present invention is capable of application to continuously sense the temperature of many elongate bodies other than strip, e.g., rod pipe and may be useful in sensing the temperature of bodies not made of metal, e.g., ceramics or glass.

In the case where the elongate body is a succession of coils of strip, which may typically be joined nose-to-tail, it is convenient to apply the paint stripe for a short length at the commencement of each coil run, this portion of the strip being subsequently discarded. By this means the system is able to provide rapid non-contact means for correcting the process control pyrometer for the conditions appertaining to each successive coil. During the production run of the coil the calibration pyrometer is inoperative.

We claim:

1. A radiation pyrometer assembly comprising, means to coat longitudinally distributed parts of an elongate body, moving longitudinally, with a coating having a substantially uniform emissivity, a process control pyrometer directed to view uncoated parts of the surface of the body, a calibration pyrometer disposed to view the coated parts of the body, and means to correct the reading of the process control pyrometer by reference to signals from the calibration pyrometer.

2. An assembly according to claim 1, wherein the correction is performed in a control station computer.

3. An assembly according to claim 1 wherein the coating means is adapted to apply the coating as a longitudinally extending stripe.

4. An assembly according to claim 3, wherein the coating means is a spraying apparatus.

5. An assembly according to claim 1 wherein means is provided to remove the coating downstream of the pyrometers.

6. An assembly according to claim 5, wherein said coating removal means comprises a brush.

7. An assembly according to claim 5 wherein the coating removal means is a washing means.

8. A method of radiation pyrometry comprising the steps of:

viewing uncoated parts of an elongate body, which is moving longitudinally, with a process control pyrometer sensitive to at least two wavelengths, depositing a coating of uniform emissivity upon parts of the elongate body, allowing the coating to reach the temperature of the body, viewing the coating with a calibration pyrometer and, from time to time correcting the reading of the process control pyrometer by means of signals from the calibration pyrometer.

9. A method according to claim 8 wherein the coating is applied intermittently to sample the temperature of sample lengths of the body.

* * * * *